Patented Dec. 11, 1934

1,984,188

UNITED STATES PATENT OFFICE 1,984,188

CALCIUM SULPHITE AND PAPER CONTAINING THE SAME

Gerald Haywood, Westernport, Md., assignor to Industrial Chemical Sales Company, Inc., New York, N. Y., a corporation of New York No Drawing. Application March 8, 1933, Serial No. 660,032

15 Claims. (Cl. 91—68)

This invention relates to the production of finely divided calcium sulphite and to the use of the same in paper.

I have discovered that calcium sulphite, when properly produced in a finely divided state, is a most excellent filler for high grade printing papers and may be used to advantage in a coating or surfacing material. It may be precipitated under suitable conditions to form particles of substantially uniform, small size which may be so evenly distributed through a fibrous, paper stock as to produce a paper of great opacity. Furthermore, due to its extreme whiteness, it produces a paper of correspondingly excellent color. The calcium sulphite, as manufactured, has a whiteness closely approaching that of magnesium carbonate which is normally used as a standard of comparison in the evaluation of whiteness. The calcium sulphite has a reflection factor of more than 98% and it reflects all portions of the spectrum equally well. There is no selective absorption to detract from the whiteness of reflected white light.

Heretofore various substances, such as china clay, talc, chalk and the like, have been added to paper as a filler but each of these substances is subject to some objection. The naturally occurring fillers are quite variable as to particle size and must be used as available. It will be found, for example, that clay varies in particle size from one to twenty microns in diameter and contains by far the greater percentage in the larger particles above fifteen microns. Calcium sulphite, on the other hand, may, by the present method, be formed with a substantially uniform particle size of two microns in diameter. This enables a given quantity of the substance to be more uniformly distributed and results in greater opacity. While chalk may be precipitated in a uniform, finely divided state under proper conditions, it has the disadvantage of reacting with the rosin and alum compound commonly used in the sizing of paper. For this reason it is not possible to size chalk filled papers, at least, not by the common expedients. Calcium sulphite, on the other hand, is chemically neutral and inert. It will not develop alkalinity by hydrolysis in a water suspension and will not react with rosin and alum.

In addition to the foregoing advantages of calcium sulphite over fillers previously employed, it produces a paper of superior whiteness and may be added in greater quantities by weight. Its fineness makes it possible to add the sulphite in greater quantities than the coarser and less uniform naturally occurring fillers, while its greater molecular weight, as compared with chalk, makes it possible to include more of it than of a high quality chalk. The fineness of the particles is such that they may be incorporated to the same extent by volume, as a fine grade of chalk which means that approximately 20% more weight may be added. Due to the chemical inertness of calcium sulphite, it may be used in paper without any change in the manufacturing processes or in the subsequent use of the product. Thus the usual sizing ingredients may be employed without difficulty and no change is required in printing inks or other technique. Furthermore, the filler in the paper will not oxidize, discolor, age or otherwise deteriorate during storage or ordinary use or handling of the product. The moisture content of the filler, as well as the combined water of the same, is so low that no disturbance of the manufacturing processes from this source can occur. There will be no danger of calender blacking, hydration, rattle, excessive stiffness and the like. Other advantages of calcium sulphite as a filler or coating substance for paper need not be enumerated here.

Calcium sulphite may be produced quite inexpensively in a fine state by the reaction between milk of lime and sulphur dioxide. It may be formed in much the same way as precipitated chalk, with the substitution of sulphur dioxide for carbon dioxide, although the operating conditions requisite to the production of an extremely fine product may differ somewhat. I have found that milk of lime of high concentration, containing, say 110 grams per liter of the mixture, is preferable for the reaction. A much finer product may be formed by the reaction of sulphur dioxide with a concentrated milk of lime than with lime water.

The milk of lime is introduced into a reaction vessel preferably provided with a paddle wheel or similar agitator adjacent the bottom. Only a small portion at the bottom of the vessel should preferably be filled with the milk of lime and the larger portion at the top should be filled with sulphur dioxide generated, for example, by the burning of sulphur. The gas rich in sulphur dioxide may be introduced in any suitable way and may be maintained at substantially atmospheric pressure or may be under a super-atmospheric pressure up to, say, 100 pounds, if desired. Upon vigorous agitation of the milk of lime by rotation of the paddle wheel, the liquid, with particles in suspension, will be whipped into a very fine spray and dispersed through the atmosphere containing sulphur dioxide. This will bring about a reaction between the gas and milk of lime resulting in the formation of calcium sulphite. The vigorous agitation may also serve to break up the precipitated sulphite into fine particles. By varying certain factors, such as the speed of rotation of the agitator and the rate of introduction of sulphur dioxide, the speed of reaction or absorption may be controlled. I have found that a rapid reaction induced by the use of a concentrated milk of lime, a gas rich in sulphur dioxide and a vigorous agitation will result in the formation of fine particles having a substantially uniform size of two microns in diameter. If lime water is used, however, and the rate of absorption slowed down, a crystalline, dense calcium sulphite will be produced, with an average particle size of twenty to twenty-five microns. Apparently the heat generated by the reaction between the lime and sulphur dioxide is beneficial to the production of fine particles; if the rate of absorption is sufficiently high, the temperature will rise since the heat will not be dissipated rapidly enough by radiation to offset it.

When the reaction in the absorption chamber has been completed, forming a suspension which is more than 80% calcium sulphite, the mixture may be withdrawn from the chamber and either reduced to a dry powdered state or used directly as produced in a suitable pulp mixture. If proper care is exercised in the conduct of the process, a product of considerably greater purity may be obtained. A mixture, containing 80% or more of the sulphite and the balance impurities of various sorts, will be found to form an excellent filler. The impurities may consist of a small percentage, say, 5%, of chalk, substantially an equal amount of calcium sulphate resulting from oxidation of a small portion of the sulphite, and up to, say, 7% of water of crystallization. While the presence of an excessive quantity of these other constituents will interfere with the production of the best results, the quantities mentioned, or even slightly more, are not seriously objectionable.

A slurry of the product from the foregoing process, either directly as formed or repulped from the dry state, may be introduced into the machine chest, for example, of a paper machine or into the beaters associated with such a machine. The quantity introduced may be varied to suit the particular requirements. Depending upon the finish, opacity, and other characteristics desired in the final product, the amount of the calcium sulphite may well vary between 10% and 35%, or even more, by weight of the mixture passed to the paper machine. The opacity of the resulting product will be considerably greater than that of any papers having equal quantities of other fillers. An indication of the opacity of the finely divided calcium sulphite, as compared with the usual clay filler, is given by the following: a layer of calcium sulphite, produced from a concentrated milk of lime, spread over a glass plate had an opacity figure of 384 while a corresponding layer of ordinary filler clay had an opacity figure of 338. The fine calcium sulphite, therefore, was nearly 14% more opaque than the clay. This may be partly explained as due to the relative bulk of the two products. When five grams of the fine calcium sulphite were shaken up in 100 c. c. of a .1% starch solution and allowed to stand for twenty-four hours, the volume of the settled particles was 17 c. c. while a corresponding amount of clay under the same conditions settled down to 8 c. c.

Due to the higher molecular weight of calcium sulphite, as compared with chalk, it is possible to add a greater percentage, by weight, without danger of picking or powdering. The particles adhere to the paper stock as readily as chalk particles of corresponding size and being heavier will constitute a greater percentage of the total weight. While it is possible and desirable to use the ordinary sizing compounds, containing rosin and alum, in connection with calcium sulphite, it will usually also be desirable to include a certain amount of starch, say, about 4% of the total mixture. This will assist in binding the particles of the filler to the fibers.

Another advantageous feature of calcium sulphite is that the pH value of a suspension of it may very readily be adjusted to suit particular requirements. It will usually be found desirable to maintain the pH value either between 5.5 and 6.5 or between 7.5 and 8.5. A low pH of around 5.5 may be obtained in the course of preparing the suspension by the use of a slight excess of gas or, if the suspension as formed has a higher pH, it may be adjusted to the desired point by the addition of an appropriate quantity of sulphuric acid. If a pH within the higher range should be desired, this may be produced by allowing a small amount of lime to remain in the suspension. When the calcium sulphite is to be added to a sized paper, it will be desirable to employ a pH within the lower range specified due to the foaming which results from the presence of alum if the pH is in the higher range. Acid colors, such as Solar blue RX, should be used when a low pH suspension is employed and these may be set with a small amount of alum. It will be found, furthermore, that in the employment of calcium sulphite having a pH of about 5.5 the use of alum for setting the size in the paper may be eliminated or, at least, the quantity employed may be greatly reduced. If a suspension, having a pH between 7.5 and 8.5 is used, direct colors, such as Pontamine fast blue RR, which do not require setting with alum, should be employed.

Comparative tests of various types of papers have demonstrated the superiority of the calcium sulphite filled paper in many particulars. Sheets of such paper appear to be slightly stronger in tear than clay or chalk filled papers. The unsized calcium sulphite paper displayed a noticeably better finish in the gloss test than the papers employing the other fillers. Furthermore, this unsized paper showed superiority in opacity tests. For example, this type of paper having 21.8% by weight of the calcium sulphite filler had an opacity value, as measured by an Akatos meter, of 76%. A clay filled paper, on the other hand, having 26.5% of the filler showed an opacity value of only 70% while a chalk filled paper having 23.4% of the filler showed an opacity value of 74.7%. It is to be expected from this that, if the filler content of the calcium sulphite paper were increased to correspond with the other papers, the opacity would be even higher. So, also, the unsized calcium sulphite sheet has proved to be of superior whiteness. It was 5 points higher on the Hess Ives scale than a corresponding chalk filled paper. A sized calcium sulphite sheet is more absorbent of inks than the other papers. This is demonstrated by the oil-strike test which shows more rapid penetration of the oil through such a sheet than through clay or chalk filled papers.

Either in lieu of or in addition to the introduction of the calcium sulphite into the paper stock in the machine chest or in the beaters it may be applied to the surface of the paper as a pigment or coating. It may be applied to either or both sides of the paper and will result in the formation of a brilliant white sheet having an exceptionally high gloss and smoothness of surface. A great advantage of calcium sulphite over other whitening substances used in the coating of paper is that it requires only a small amount of casein to bind it to the body stock. Only about 15% of casein is required for this purpose while other substances of similar fineness, like satin white, produced by the reaction between milk of lime and alum, require approximately 40% of the casein. A typical coating mixture, which may be produced with the calcium sulphite, may comprise 18% casein and the balance substantially pure calcium sulphite. If desired, one or more other finely divided fillers, such as chalk, clay, talc and the like, may be mixed in suitable proportions with the calcium sulphite. A small amount of starch may also be added advantageously. The amount of casein employed should vary with the fineness of the particles of the filler and with the nature of the filler used. Ordinarily, the finer the particle size of the filler, the more casein will be required. It is desirable to employ as little casein as is required to bind the filler to the fibers of the paper as it is more expensive than the filler itself and it adversely affects the finish imparted to the paper. While a fine grade of calcium sulphite will usually require about 15% to 18% of the casein, the quantity used may well vary between 12% and 30%. The coating mixture may be applied to textile fabrics as well as to the paper, if desired, or to paper board, or other matted or pressed material.

While the proportions of various ingredients and the conditions under which various phases of the processes of making the calcium sulphite and the product incorporating this substance have been specified in considerable detail, it will be understood that a variety of changes may be made without departing from the general spirit and scope of the invention as defined by the claims.

I claim:

1. As an article of manufacture a paper sheet containing substantially 10% or more by weight of commercially pure, finely divided calcium sulphite as produced by the reaction between milk of lime and sulphur dioxide.

2. As an article of manufacture a paper sheet containing substantially 10% or more by weight of a filler comprising more than 80% calcium sulphite distributed therethrough in a finely divided state.

3. As an article of manufacture a paper sheet containing between 10% and 35% by weight of a filler comprising more than 80% calcium sulphite distributed therethrough in a finely divided state.

4. A coating substance for paper and the like comprising 12% to 30% casein and a major portion of the balance finely divided calcium sulphite.

5. As an article of manufacture a paper sheet containing substantially 10% or more by weight of calcium sulphite of substantially uniform particle size.

6. As an article of manufacture a sized paper sheet having incorporated therein a filling substance the major portion of which comprises commercially pure calcium sulphite in a finely divided state.

7. As an article of manufacture a paper sheet containing a rosin-alum size and a filling substance having as a principal ingredient quantitatively calcium sulphite in a finely divided state.

8. As an article of manufacture a sized paper sheet having a coating on at least one surface including calcium sulphite as a principal ingredient quantitatively.

9. As an article of manufacture a paper sheet containing a rosin-alum size, a small amount of starch, and substantially 10% or more by weight of calcium sulphite in a finely divided state.

10. As an article of manufacture a sized paper sheet having a coating on at least one surface comprising 12 to 30% casein and the balance principally calcium sulphite.

11. A coating substance for paper and the like comprising a finely divided filler and a sufficient quantity of binder to hold the particles together, the major portion of said filler being commercially pure calcium sulphite.

12. A method of producing paper which comprises mixing fibrous material with an acid suspension of a filler comprising calcium sulphite and forming the mixture into a sheet, the calcium sulphite being present in the mixture to a sufficient extent to constitute between about 10 and 35% of the sheet.

13. A method of producing paper which comprises mixing fibrous material with an acid suspension of a filler and sizing ingredients, the filler containing calcium sulphite as a principal ingredient quantitatively, and forming the mixture into a sheet.

14. As an article of manufacture a paper sheet containing sizing ingredients and substantially 10% or more by weight of calcium sulphite in a finely divided state.

15. As an article of manufacture a paper sheet containing a filler having calcium sulphite as a principal ingredient quantitatively.

GERALD HAYWOOD.